United States Patent [19]

Fahner et al.

[11] Patent Number: 4,822,973
[45] Date of Patent: Apr. 18, 1989

[54] COMPOSITE PLASTIC WITH LASER ALTERED INTERNAL MATERIAL PROPERTIES

[75] Inventors: Karsten Fahner, Winnenden-Birkmannsweiler; Hans-Werner Depcik, Duesseldorf, both of Fed. Rep. of Germany

[73] Assignee: Bayer Aktiengesellschaft, Fed. Rep. of Germany

[21] Appl. No.: 79,515

[22] Filed: Sep. 28, 1987

Related U.S. Application Data

[62] Division of Ser. No. 716,757, Mar. 27, 1985.

[30] Foreign Application Priority Data

Mar. 30, 1984 [DE] Fed. Rep. of Germany ....... 3411797

[51] Int. Cl.⁴ .............................................. B23K 26/00
[52] U.S. Cl. ................................. 219/121.6; 346/76 L
[58] Field of Search ...................... 219/121.66, 121.85, 219/121.65, 121.6; 346/76 L

[56] References Cited

U.S. PATENT DOCUMENTS

| | | | |
|---|---|---|---|
| 4,286,250 | 8/1981 | Sacchetti | 219/121 L X |
| 4,489,230 | 12/1984 | Yamamoto | 219/121 LF |
| 4,584,456 | 4/1986 | Oodaira et al. | 338/195 X |
| 4,694,138 | 9/1987 | Oodaira et al. | 219/121 LF |

*Primary Examiner*—C. L. Albritton
*Attorney, Agent, or Firm*—Connolly and Hutz

[57] ABSTRACT

An identification mark which remains permanently readable is applied by means of a laser beam through a lightwave window of plastics material to a plastics layer situated behind that window.

7 Claims, 2 Drawing Sheets

COMPOSITE PLASTIC WITH LASER ALTERED INTERNAL MATERIAL PROPERTIES

This application is a division of application Ser. No. 716,757 filed Mar. 27, 1985 pending.

This invention relates to a plastics part and to a laser process for altering material properties, more particularly for marking a plastics part beneath its surface.

Visible or invisible marking is necessary for certain plastics parts to identify their function so that they may be operated accordingly (for example, keys) or electronically scanned.

Tampo-printing, screen printing and transfer printing are all known processes in which the identifications are applied by printing.

The disadvantage of these processes lies in the fact that the identification can become unreadable through mechanical damage (scratches), abrasion and chemical influences and, as a result, no longer fulfills its function. In addition, the imprint is particularly difficult to apply to curved or textured surfaces. Tooling and block costs are particularly high in the case of unit production.

Plastics parts in which the identification is produced by two-colour injection moulding are also known. This process is very expensive because separate complicated tools are required for each colour. Tooling costs are high. Changing the identification involves considerable effort so that this process is only suitable for high-volume production.

Laser beam processes in which the idenification is burnt onto the surface of the plastics part are also known. These processes are attended by the disadvantage that the rough surface has to be coated with a transparent lacquer on account of the danger of contamination and the unpleasant feel, and this is a very involved operation in the case of mass-produced parts and therefore very expensive.

SUMMARY OF THE INVENTION

An object of the present invention is to provide a flexible, fast process with suitable plastics parts by which it is possible to obtain a permanent change in material properties, more particularly marking with characters, which can be detected at any time by selected means (magnet, light, electricity) and which cannot be subsequently influenced by chemical or mechanical damage or by deliberate manipulation (tamperproof).

According to the invention, this object is achieved in that at least one laser beam passes through the surface zone of a first plastic material nearly with virtually no losses of energy, in order subsequently to produce by absorption of the laser beam in a following, inaccessible region of plastic material new, permanent detectable material properties.

It is surprising to the expert to combine several layers having different absorption coefficients, for example, by the two-component process, in such a way that a laser beam passes through the upper, predominantly transparent region of plastics material without major energy losses ($\leq 10$) and hence without affecting this material, and the shortest path is then absorbed by the material, particularly plastics material, in a following region not directly accessible from outside, to such an extent that the heat generated in that region brings about a change in colour and transformation of the molecular structure or destruction (cut) of the material. Using a programguided laser beam, it is possible by this process quickly and economically to obtain a clearly defined marking which can be read back at any time. The outer plastics material, which may be transparent to the eye or opaque to electronic reading, acts as a wave window of which the smooth outer surface protects the internally situated marking against mechanical or chemical damage and contamination. The marking cannot be subsequently altered without destruction. In addition, interruptions may be specifically produced, in particular, in a reflecting layer, the arrangement of which; may be subsequently read by digital means.

BRIEF DESCRIPTION OF THE DRAWING

Novel features and advantages of the present invention will become apparent to those of ordinary skill in the art from a reading of the following detailed description in conjunction with the accompanying drawing wherein.

DETAILED DESCRIPTION OF THE INVENTION

Figure 1:
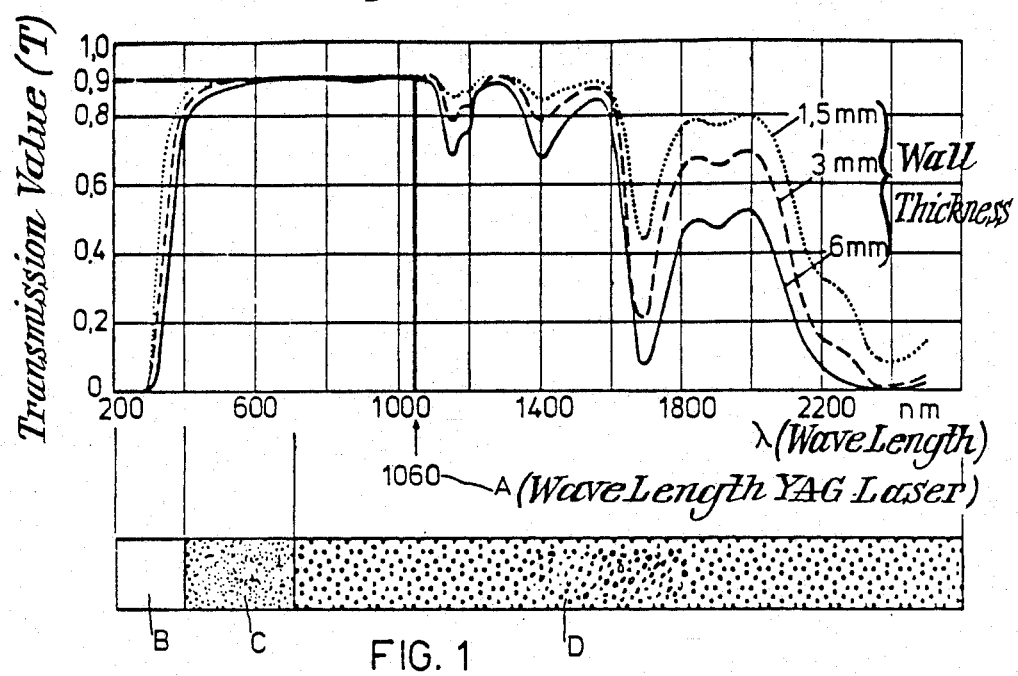
FIG. 1 is a graph of wave lengths and transmission values for plastic parts having different wall thicknesses.

In one particular embodiment of the process, the laser beam used has a wavelength of from 1 to 20 $\mu$m, more particularly of 1.06 $\mu$m.

Depending on the material, a variation within the above-mentioned range is advantageous, the effect increasing with increasing wavelength until at the upper limit, the material is cut through. A wavelength if 1.06 $\mu$m has proved to be particularly suitable for lettering.

In another embodiment of the process, several laser beams are focused at the point of use. By concentrating the laser beams at the place to be marked, a higher energy is generated there so that the desired changes take place very quickly, increasing the workrate.

In another embodiment of the process, the laser beam is controlled in accordance with the required shape of the symbol of the desired marking. By programmed control, it is possible to mark the plastics parts quickly and easily.

In one possible embodiment of the process, a carbonized conductive path is burnt into the second plastics material in accordance with the predetermined guidance of the laser emitter.

Carbonizing polyacrylonitrile (PAN), for example, in the absence of oxygen produces carbon as conductive material (conductivity 10–100 ohms/cm) which may be used as electrical conductor so that printed-circuit boards may be produced in this way.

In a plastics part produced by the process according to the invention, the surface with a layer thickness of from 0.05 to 2 mm has a light transmission value greater than 0.8 and, more particularly, greater than 0.9 at a wavelength of from 1000 to 20,000 $\mu$m and the subsequent material region within a depth of 2 mm, a light absorption value greater than 80% of the incident laser beams, this region containing a subsequently induced change in the material by way of marking.

It is surprising that it is possible to produce a composite product in which the laser beam passes through the upper region (wave window) and then, through high absorption in a material region which is not directly accessible, produces a change in colour, a change in the molecular structure and/or destruction (cutting) of the material. The contours are so sharp that the markings burnt in can always be satisfactorily read magnetically and/or optically within the material region. Readability is not externally influenced by the smooth surface. The identification marks are also largely tamper-proof because they cannot be erased.

In one particular embodiment, the material region consists of a plastics material.

Composites of thermoplastic materials which show good adhesion and compatibility with one another and similar contraction behaviour are suitable for the plastics part. Examples of suitable composites are cellulose acetate as one layer and acrylonitrile-butadiene-styrene-copolymer, cellulose acetate, or ethylene vinyl acetate copolymer as the other layer. Also, other composites include polycarbonate as one layer and acrylonitrile-butadiene-styrene-copolymer or polycarbonate as the other layer.

In one embodiment, the material region contains metallic inclusions.

Metallic inclusions, which may be present in the form of vapour deposits, powders, flakes or foils, have the advantage that, after the change, the electrical conductivity or degree of reflection may be used for transmitting information.

EXAMPLE

A test is carried out with a YAG laser which has the following characteristics:

| wavelength | 1.06 um = 1060 um |
|---|---|
| frequency | 15 KHz |
| power | 6 W |
| exposure time | 200 mm/s |
| current | 15 A |

Figure 2:
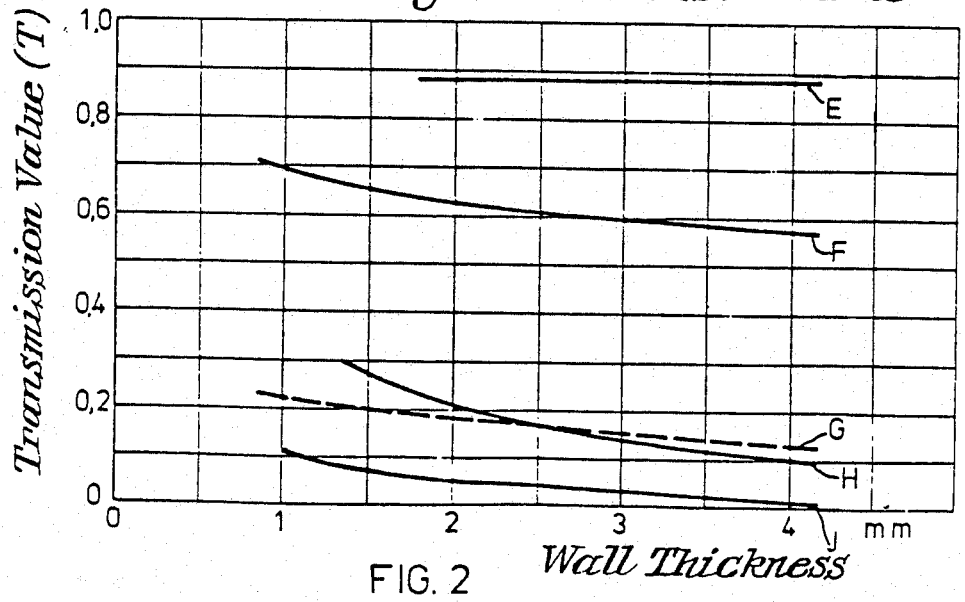
FIG. 2 is a graph of transmission values and wall thicknesses for the plastic parts.

The plastics part consists of a natural-coloured polycarbonate (Makrolon 3100) in FIG. 1 and of the same polycarbonate (Makrolon 3100) coloured with signal (absorption value signal Blue >90%) in FIG. 2.

In FIGS. 1 and 2 the symbols represent the following:
A wavelength YAG laser 1.06 um
B wavelength ultraviolet rays section
C wavelength visible rays section
D wavelength infrared rays section
E signal white rays
F signal yellow rays
G signal red rays
H signal green rays
J signal blue rays The desired characters and geometric symbols are stored in a character generator in a microcomputer. Programming can be carried out in a few minutes; numbers or character combinations with geometric symbols are made up into programs through the terminal keyboard. The programs are stored on a mini floppy disc. Approx. 15 symbols 2 mm in height are written per second.

The focused laser beam burns clearly readable scratchproof character into the workpiece. Laser beam marking enables our thermoplastic (finished parts, semi-finished parts, sheets), to be identified without pre or after-treatment, be smooth and in all optically accessible places. Very high production rates are possible.

If the frequency is varied in the range from 10 to 20 KHz, power generally decreases with increasing frequency (pulses/s) so that grey to light grey character quality is obtained on account of the low absorption. The exposure time should be between 150 mm/s and 300 mm/s as, in the first case, a deep black record is obtained, which gradually changes to shades of grey as the exposure time is altered. Absorption and hence the darkness of the inscription increases with increasing current (10–18 A). The above-mentioned parameters should be adapted to the particular material for the purpose of optimization. Suitable plastics materials include inter alia high molecular weight, thermoplastic, aromatic polycarbonates having weight average molecular weights ($M_w$) of from 10,000 to 20,000 and preferably from 20,000 to 80,000, particularly based on bisphenol A, thermoplasts having a low tracking resistance (KC 250) and a high absorption value through added pigments being particularly suitable.

Figure 3:
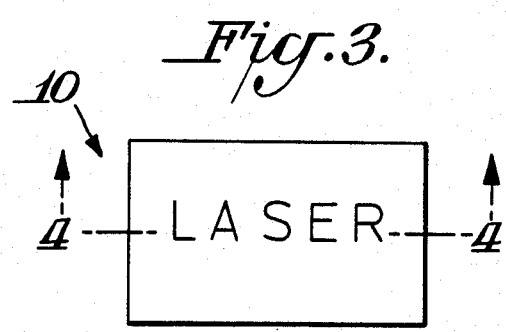
FIG. 3 is a top plan view of a plastic part with internal markings therein, according to the present invention.
Figure 4:
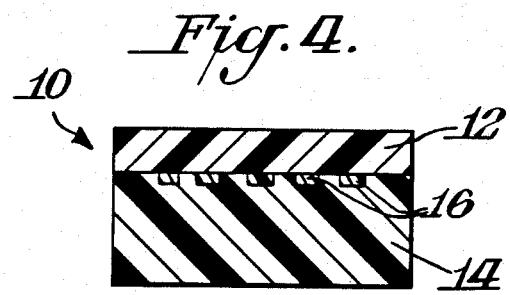
FIG. 4 is a sectional view taken along line 4—4 of FIG. 3.

FIGS. 3 and 4 illustrate a plastic part 10 according to the present invention having a surface layer 12 of thermoplastic material and a base 14 of thermoplastic material. These materials have good adhesive and compatibility with one another and similar contraction behavior. Laser induced changes 16 are located within the interior of plastic part 10 as shown.

We claim:

1. A composite plastic part of thermoplastic materials having good adhesion and compatability with one another and similar contraction behavior and having material properties altered by a laser beam, the composite plastic part having a thermoplastic surface layer with a layer thickness of from 0.1 to 2 mm, a light transmission value $\tau$ of greater than 0.8 and more particularly greater than 0.9 at a wavelength of from 1000 to 20,000 um, and an internal thermoplastic material region below the surface layer with a light absorption value to a depth of 2 mm of greater than 80% of incident laser beams, internal thermoplastic material region containing a subsequently laser induced change therein.

2. A composite plastic part as in claim 1 wherein the internal thermoplastic material region contains metallic inclusions.

3. A composite plastic part as in claim 1 wherein the internal thermoplastic material region consists of polyacrylonitrile.

4. A composite plastic part as in claim 1 wherein the subsequently laser induced change in the internal thermoplastic material region is in the form of a carbonized electrically conductive path.

5. A composite plastic part as in claim 3 wherein the subsequently laser induced change in the internal thermoplastic material region is in the form of a carbonized electrically conductive path.

6. A composite plastic part as in claim 1 wherein one thermoplastic material is cellulose acetate and the other thermoplastic material is at least one of acrylonitrile-butadiene-styrene, cellulose acetate and ethylene vinyl acetate.

7. A composite plastic part as in claim 1 wherein one thermoplastic material is polycarbonate and the other thermoplastic material is at least one of polycarbonate and acrylonitrile-butadiene-styrene.

* * * * *